Sept. 5, 1939.   E. K. VON MERTENS   2,171,773
FASTENING DEVICE
Filed Sept. 17, 1934
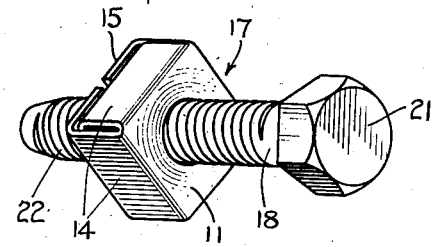
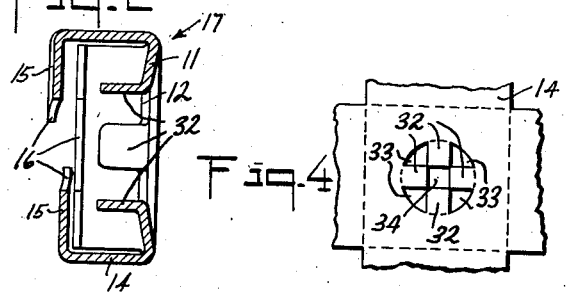
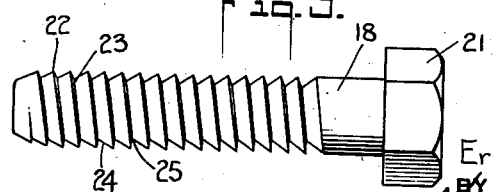
INVENTOR
Ernest K. von Mertens
BY
HIS ATTORNEY Patented Sept. 5, 1939

2,171,773

UNITED STATES PATENT OFFICE 2,171,773

FASTENING DEVICE

Ernest K. von Mertens, New York, N. Y.

Application September 17, 1934, Serial No. 744,313

1 Claim. (Cl. 85—36)

My present invention relates to fastening devices and more particularly to an improved self-tightening nut for cooperation with a suitable screw, bolt, or other threaded device.

In attaching two or more parts together by means of a bolt and nut it is ordinarily necessary to pass a bolt through holes in such parts and to screw a nut onto the threads of the bolt. Further, to prevent the nut from backing off the threading of the bolt, thus loosening the connection between the parts to be attached, it has been found necessary to make additional provision, as for example to castellate the nut and perforate the body of the bolt in order to pass a cotter pin therethrough to engage with the castellations of the nut, or to employ lock nuts and other accessory elements. Also, assuming the articles attached together are subjected to vibration or to wear, giving rise to relative displacement, it becomes necessary to periodically tighten up the nut on the bolt to compensate for the same. Furthermore, the operation of screwing a nut onto a bolt and securing the same in position is tedious and markedly adds to the cost of the assembly of screw attached articles.

My present invention obviates the stated and like objections by the provision of a nut or equivalent which may be made of any conventional exterior form such as square, hexagonal, octagonal, etc., and having portions thereof serving to effect attachment with the threading of a bolt, or equivalent, resiliently related, thus enabling the nut to be slid by mere longitudinal or axial movement with respect to the threading until the nut attains its approximate tightening position, whereafter but partial turning is required, as by a conventional wrench, to position the nut into its final attaching position.

My invention is applicable for use with any suitable type of bolt, screw or like threaded device. I prefer a form of threading, namely, of a wedge shape in cross section or generally of the type of threading of a conventional lag screw, and most preferably in which the diameter of the core tapers gradually from the end of the threading toward its head.

In carrying out my invention I utilize as material for making the improved nut resilient sheet metal, or equivalent, preferably spring steel, blanked out from a sheet and folded to assume an exterior shape usually polygonal, one end face being perforated to a diameter, preferably slightly larger than the exterior diameter of the threading, and the other end face formed of a plurality of inwardly extending wings which engage with the threading of the bolt or equivalent.

A principal object of my invention therefore is an improved self-tightening nut.

An object of my invention is an improved form of bolt for association with my improved nut.

An object of my invention is an improved self-tightening nut formed of sheet material.

A general objective of my invention is the attainment of low cost of nut and of low cost of assembly with a cooperative threaded device.

Further features and objects of my invention will be more fully understood from the following detail description and the accompanying drawing, in which Fig. 1 is a perspective view of one form of embodiment of my improved self-tightening nut mounted on a bolt having suitable threading.

Fig. 2 is a sectional side elevation of an embodiment of a nut pursuant to my invention.

Fig. 3 is a side elevation of a preferred form of a tapered core, threaded element.

Fig. 4 is a development of the central portion of a blank from which the nut shown in Fig. 2 may be formed.

Referring to the drawing, and particularly to Figs. 1, 2, 3 and 4, there is shown a blank of sheet metal, preferably of spring steel, having an end face portion 11, in this instance square in plan view; the end face 11 is provided with a perforation 12 of a size exceeding, and preferably but slightly exceeding, the diameter of an appropriate bolt, screw or equivalent. Said end face portion 11 engages the face of the work, i. e., a plate or other part to be connected to a plate or other part upon tightening of the nut relative to the bolt, screw or equivalent, and accordingly said end face portion 11 serves as the work engaging face portion. Formed integral with the portion 11 and extending radially outward from each of the indicated four sides thereof are wings formed of two portions 14 and 15 respectively. The portions 14 in the finished nut constitute the sides of the nut and are adapted to be engaged by a wrench or similar device, said portions 14 accordingly serving as the receiving face portions, each portion 15 is disposed substantially at right angles to its portion 14 and substantially parallel to the portion 11; each portion 15 is provided at its face edge with an arcuate notch 16, preferably having a diameter slightly greater than the diameter of the threading of the bolt at the bottom of the threads and appreciably less than the diameter of the threading at the top of such threads. The nut 17 is provided with central, inwardly extending means, such as ears 32, serving dually to facilitate the operation of advancing the nut axially of the bolt or screw, and also as stops for the terminal portions of the respective thread engaging portions 15. The function of the ears 32 as stops ensues upon tightening up the nut "home", with resulting approach of the thread engaging portions 15 to or toward the respective ears 32. Other forms of bending or drawing of the metal or other material inwardly of the central portion of the work engaging face 11 may be employed.

Such nut 17 may be readily formed from a blank, as is shown in Figure 4, the central area of the material being blanked out to provide lateral openings 33 and a center opening 34 respectively between the ears 32, the ears 32 being bent back to their respective positions as indicated in Figure 2.

In utilizing the blank shown in Fig. 4 to form the nuts shown in Figs. 1 and 2, the tool receiving face portions 14 are folded to a position at right angles to the work engaging face portion 11 and the portions 15 are then folded inwardly to a position generally parallel to the end face portion 11, the notches 16 jointly forming practically a complete circumference.

The portions 15, as appears in Figs. 1 and 2, lie in adjacent planes so as to conform to arcs of the helix of the threading of the bolt or equivalent, the portions 15 accordingly serve as thread engaging portions. The work engaging end face portion 11 is preferably slightly concaved or dished as shown in Fig. 2, to thereby enhance the gripping engagement of the work engaging end face 11 with the part it engages in fastening position, and to re-inforce the resiliency and gripping functions exercised by the respective thread engaging portions 15.

A preferred form of thread 22, of the bolt or equivalent, may be of a helix of wedge-shape in which a valley 23 is formed between adjacent convolutions. Such convolutions, as shown, are wedge-shaped in that one face 24 is of a gradual rise and the other face 25 of a relatively steep descent. The arcuate notches 16 of one or more of the edge portions 15 of the nut 17 are thus arranged to lie in a valley 23 while the remainder of the notches 16 are brought under pressure into engagement with an adjacently lying relatively steep face 25, thereby effecting a hold of maximum rigidity upon the threading of the bolt 22.

By reason of the relatively free positioning of the thread engaging portions 15 of the wings of the nut, the nut upon locating its opening 12 about the threaded portion of the bolt or equivalent is readily slid longitudinally, that is, axially, with respect to the threading, until approximate contact is made by its work engaging end face 11 with the part sought to be secured by the nut in cooperation with the bolt.

In the use of a bolt or screw whose core is convergently tapered in the direction towards its head, the diameter of the core of the threaded portion of such bolt or screw 18 at its free end is greater than at the end of the threading adjacent its head 21, and preferably graduated in decrease of diameter in the direction from its free end toward its head end, whereby upon securing any articles which are subjected to vibration and/or wear, the resiliency of the material of the thread engaging portions 15 of the nut 17 under conditions of vibration bias the nut to rotate about the screw toward its head 21, thus imparting the quality of self-tightening action between the nut and the screw. A similar action takes place in the event of wear at the arcuate wing faces.

From the above, it appears that the nuts embodying my invention are formed of sheet or equivalent material, radiating from a central part provided with an opening, and parts, preferably symmetrically arranged to receive a wrench or equivalent and wings extending in different directions toward one another, the terminal edges of which are arcuate or otherwise shaped to engage the threading of a cooperating bolt or equivalent, to effect locking therewith under pressure.

I claim:

A nut for a threaded cylindrical element, said nut constituted wholly of single sheet material, comprising a central portion provided with a perforation, ears extending from and transversely to said central portion at the periphery of said perforation spacially related to one another, the diameter of said perforation and the diameter effectively defined by said ears being materially greater than the maximum effective diameter of said threaded cylindrical element, a plurality of wings bent at its margin with said central portion and extending about the periphery of said central portion spacially from one another, each of said wings being further bent in a reverse direction at a location intermediate its said margin and its free end, the stated perforation being arranged to freely receive the threaded portion of said threaded element, said central portion serving as the work engaging face portion of the nut, said free end portions of said wings respectively extending radially to and engaging the threading of said threaded element, the portions of said wings between the respective bent portions of said wings serving as the tool receiving face portions.

ERNEST K. VON MERTENS.